United States Patent
Maraboina

(10) Patent No.: US 11,055,310 B2
(45) Date of Patent: Jul. 6, 2021

(54) SQL SERVER INTEGRATION SERVICES (SSIS) PACKAGE ANALYZER

(71) Applicant: BANK OF AMERICA CORPORATION, Charlotte, NC (US)

(72) Inventor: Nishanth Maraboina, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 847 days.

(21) Appl. No.: 15/830,966

(22) Filed: Dec. 4, 2017

(65) Prior Publication Data

US 2019/0171750 A1 Jun. 6, 2019

(51) Int. Cl.
*G06F 16/25* (2019.01)
*G06F 16/245* (2019.01)
*G06F 40/205* (2020.01)

(52) U.S. Cl.
CPC .......... *G06F 16/258* (2019.01); *G06F 16/245* (2019.01); *G06F 16/254* (2019.01); *G06F 40/205* (2020.01)

(58) Field of Classification Search
CPC .... G06F 16/258; G06F 16/245; G06F 16/254; G06F 40/205
See application file for complete search history.

(56) References Cited

U.S. PATENT DOCUMENTS

| | | | |
|---|---|---|---|
| 5,857,197 A | 1/1999 | Mullins | |
| 5,920,867 A | 7/1999 | Van Huben et al. | |
| 6,035,297 A | 3/2000 | Van Huben et al. | |
| 6,654,747 B1 | 11/2003 | Van Huben et al. | |
| 7,577,934 B2 | 8/2009 | Anonsen et al. | |
| 7,730,446 B2 | 6/2010 | Anonsen et al. | |
| 7,761,406 B2 | 7/2010 | Harken | |
| 7,917,889 B2 | 3/2011 | Devarakonda et al. | |
| 9,396,037 B2 * | 7/2016 | Morsi | G06F 11/3409 |
| 9,507,838 B2 * | 11/2016 | Leigh | G06F 16/254 |
| 2004/0054675 A1 | 3/2004 | Li | |

(Continued)

OTHER PUBLICATIONS

Execute Package Task, "https://docs.microsoft.com/en-us/sql/integration-services/control-flow/execute-package-task?view=sql-server-ver15" Mar. 14, 2017 (Year: 2017).*

(Continued)

*Primary Examiner* — Alicia M Willoughby
(74) *Attorney, Agent, or Firm* — Michael A. Springs; Moore & Van Allen PLLC; Anup Shrinivasan Iyer

(57) ABSTRACT

Systems, computer program products, and methods are described herein for execution of SQL Server Integration Service (SSIS) package. The present invention is configured to electronically receive a user request to execute one or more SSIS packages; retrieve the one or more SSIS packages; initiate an execution of the one or more SSIS packages, wherein the execution further comprises: traversing through each of the one or more steps associated with each of the one or more SSIS packages; identifying one or more files associated with the one or more SISS packages at each of the one or more steps; parsing each file at each step to identify one or more SQL commands embedded in each of the one or more files; and executing each of the one or more identified SQL commands, wherein executing further comprises exporting data; and load the exported data into one or more external databases.

17 Claims, 3 Drawing Sheets

(56) References Cited

U.S. PATENT DOCUMENTS

| | | | |
|---|---|---|---|
| 2005/0228728 A1* | 10/2005 | Stromquist | G06Q 40/12 |
| | | | 705/30 |
| 2005/0243604 A1 | 11/2005 | Harken et al. | |
| 2006/0212846 A1 | 9/2006 | O'Farrell et al. | |
| 2007/0283443 A1 | 12/2007 | McPherson et al. | |
| 2008/0082569 A1 | 4/2008 | Mansour et al. | |
| 2008/0126552 A1* | 5/2008 | Berger | G06F 9/5038 |
| | | | 709/230 |
| 2009/0024647 A1 | 1/2009 | Hein | |
| 2009/0043778 A1* | 2/2009 | Jambunathan | G06F 16/254 |
| 2009/0063664 A1* | 3/2009 | Tiberio, Jr. | G06F 9/542 |
| | | | 709/222 |
| 2009/0125796 A1 | 5/2009 | Day et al. | |
| 2009/0222749 A1 | 9/2009 | Marinescu et al. | |
| 2010/0211539 A1* | 8/2010 | Ho | G06F 16/972 |
| | | | 707/602 |
| 2010/0250566 A1* | 9/2010 | Paul | G06F 16/283 |
| | | | 707/756 |
| 2010/0280863 A1 | 11/2010 | Wilcock et al. | |
| 2010/0305922 A1 | 12/2010 | Williamson | |
| 2010/0306254 A1 | 12/2010 | Williamson | |
| 2010/0306272 A1 | 12/2010 | Williamson | |
| 2011/0055850 A1 | 3/2011 | Williamson | |
| 2011/0282851 A1* | 11/2011 | Sivashanmugam | G06F 16/2455 |
| | | | 707/705 |
| 2011/0320399 A1* | 12/2011 | Ledwich | G06F 16/254 |
| | | | 707/602 |
| 2012/0054147 A1 | 3/2012 | Goetz et al. | |
| 2012/0265870 A1* | 10/2012 | Zhang | G06F 11/3006 |
| | | | 709/224 |
| 2013/0103722 A1* | 4/2013 | Ablack | G06Q 30/0603 |
| | | | 707/803 |
| 2013/0179313 A1* | 7/2013 | Basu | G06Q 40/10 |
| | | | 705/30 |
| 2015/0286734 A1* | 10/2015 | Odutola | G06F 16/22 |
| | | | 705/310 |
| 2016/0306817 A1 | 10/2016 | Heilig et al. | |
| 2017/0011087 A1* | 1/2017 | Hyde | G06F 16/211 |
| 2018/0108058 A1* | 4/2018 | Cotton | G06Q 30/01 |
| 2019/0087770 A1* | 3/2019 | Walsh | G06F 16/244 |

OTHER PUBLICATIONS

Mehta, Ashish. "Different Ways to Execute a SQL Server SSIS Package" "https://www.mssqltips.com/sqlservertip/1775/different-ways-to-execute-a-sql-server-ssis-package/" Jun. 18, 2009 (Year: 2009).*

* cited by examiner

SQL SERVER INTEGRATION SERVICES (SSIS) PACKAGE ANALYZER

FIELD OF THE INVENTION

The present invention embraces a system for executing a SQL Server Integration Services (SSIS) packages.

BACKGROUND

SQL Server Integration Services (SSIS) is a platform for data integration and workflow applications. It features a data warehousing tool used for data extraction, transformation, and loading (ETL). The tool may also be used to automate maintenance of SQL Server databases and updates to multidimensional cube data. An SSIS package is an organized collection of connections, control flow elements, data flow elements, event handlers, variables, parameters, and configurations, that are capable of being assembled using either the graphical design tools that SQL Server Integration Services provides, or built programmatically.

There is a need for a system to extract information from multiple SSIS packages efficiently, improve data extraction time, and reduce error rate.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for execution of SQL Server Integration Service (SSIS) package is presented. The system comprising: at least one non-transitory memory device with computer-readable code stored thereon; at least one processing device; and at least one module stored in said memory device and comprising instruction code that is executable by the at least one processing device and configured to cause said at least one processing device to: electronically receive a user request to execute one or more SSIS packages, wherein each of the one or more SSIS packages comprises one or more steps; retrieve the one or more SSIS packages; initiate an execution of the one or more SSIS packages, wherein the execution further comprises: traversing through each of the one or more steps associated with each of the one or more SSIS packages; identifying one or more files associated with the one or more SISS packages at each of the one or more steps; parsing each of the one or more files at each of the one or more steps, wherein parsing further comprises identifying one or more SQL commands embedded in each of the one or more files; and executing each of the one or more identified SQL commands based on at least one or more data flows and one or more control flows, wherein executing further comprises exporting data; and load the exported data into one or more external databases.

In some embodiments, the module is further configured to parse information associated with one or more data sources and one or more external databases.

In some embodiments, the module is further configured to execute each of the one or more identified SQL commands, wherein executing further comprises: establishing a communication link with each of the one or more data sources associated with each of the one or more identified SQL commands; retrieving the data from each of the one or more data sources, wherein retrieving further comprises determining one or more field names and one or more columns names; transforming the retrieved data based on at least one or more pre-determined transformations; and exporting the transformed data into the one or more external databases.

In some embodiments, the module is further configured to: store the data retrieved from the one or more data sources in one or more staging tables in a temporary memory location prior to transforming the data; filter the data to remove one or more unneeded field names and one or more unneeded columns names; and transform the filtered data.

In some embodiments, the module is further configured to receive the user request to execute the one or more SSIS packages, wherein the request further comprises a request to export data associated with one or more task types.

In some embodiments, the execution of the one or more SSIS packages do not require the one or more SSIS packages to be opened.

In some embodiments, the module is further configured to: determine that at least one of the one or more SQL commands are unexecutable; generate an error message comprising the at least one of the one or more SQL commands that are determined to be unexecutable; and transmit control signals configured to cause a user device to display the generated error message.

In some embodiments, transforming further comprises transforming the data from one or more unstructured formats to a structured format to be loaded into one or more external databases.

In another aspect, a computerized method for execution of SQL Server Integration Service (SSIS) package is presented. The method comprising: electronically receiving a user request to execute one or more SSIS packages, wherein each of the one or more SSIS packages comprises one or more steps; retrieving the one or more SSIS packages; initiating an execution of the one or more SSIS packages, wherein the execution further comprises: traversing through each of the one or more steps associated with each of the one or more SSIS packages; identifying one or more files associated with the one or more SISS packages at each of the one or more steps; parsing each of the one or more files at each of the one or more steps, wherein parsing further comprises identifying one or more SQL commands embedded in each of the one or more files; and executing each of the one or more identified SQL commands based on at least one or more data flows and one or more control flows, wherein executing further comprises exporting data; and loading the exported data into one or more external databases.

In yet another aspect, a computer program product for execution of SQL Server Integration Service (SSIS) package is presented. The computer program product comprising a non-transitory computer-readable medium comprising code causing a first apparatus to: electronically receive a user request to execute one or more SSIS packages, wherein each of the one or more SSIS packages comprises one or more steps; retrieve the one or more SSIS packages; initiate an execution of the one or more SSIS packages, wherein the execution further comprises: traversing through each of the one or more steps associated with each of the one or more SSIS packages; identifying one or more files associated with the one or more SISS packages at each of the one or more steps; parsing each of the one or more files at each of the one or more steps, wherein parsing further comprises identifying one or more SQL commands embedded in each of the one or more files; and executing each of the one or more identified SQL commands based on at least one or more data flows and one or more control flows, wherein executing further comprises exporting data; and load the exported data into one or more external databases.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
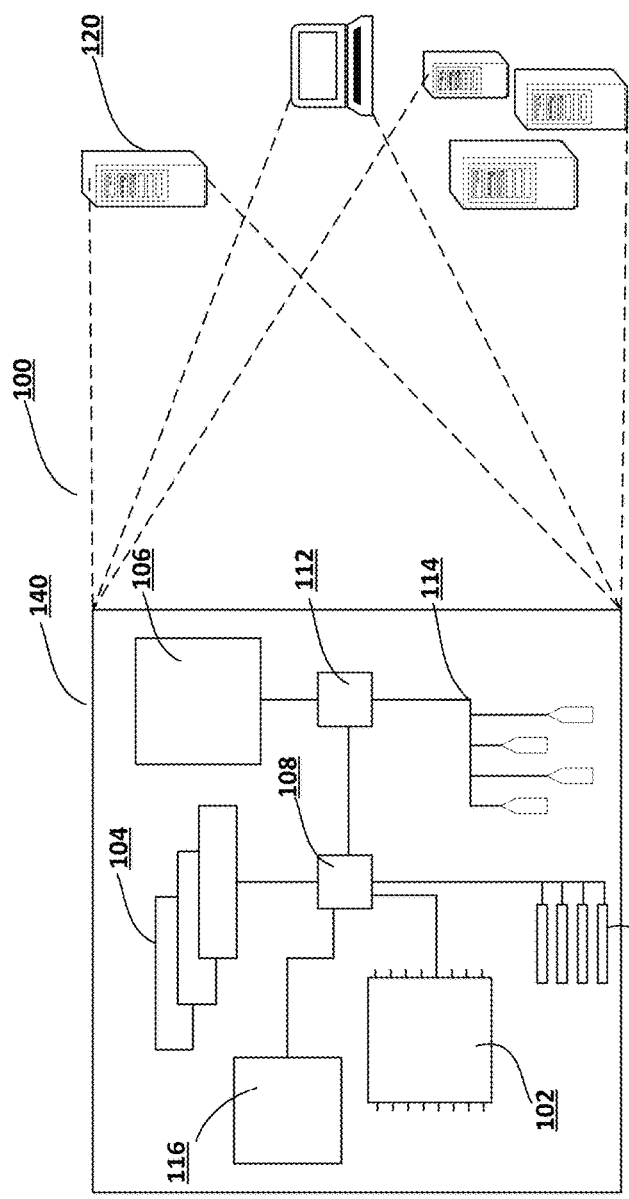
Figure 1:
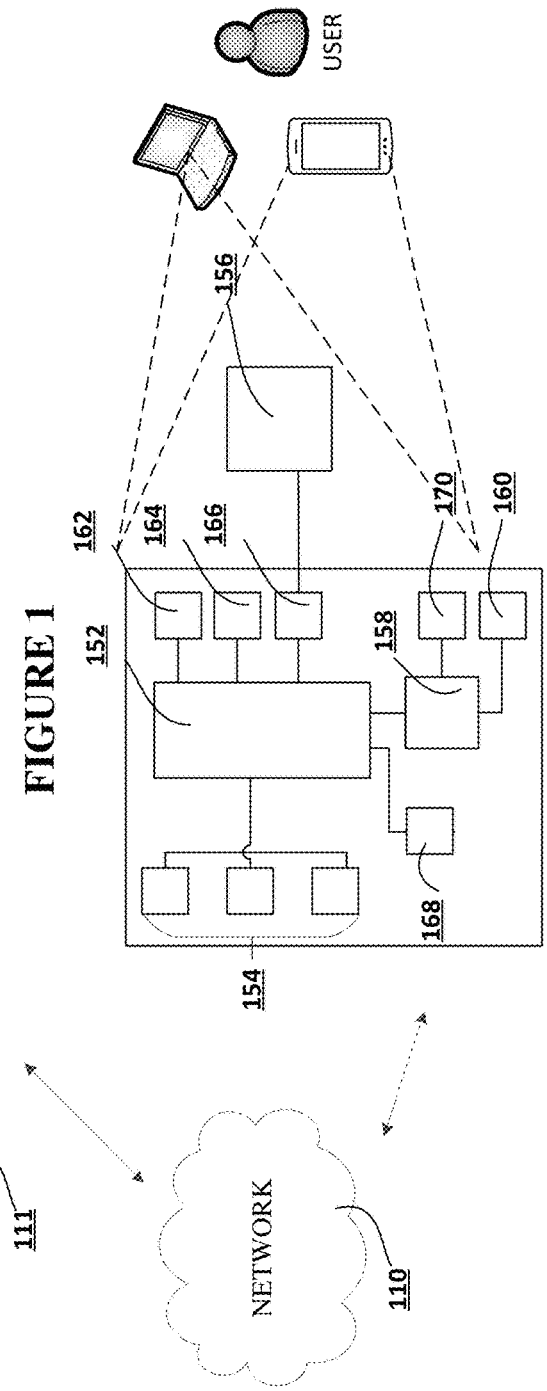
Figure 2:
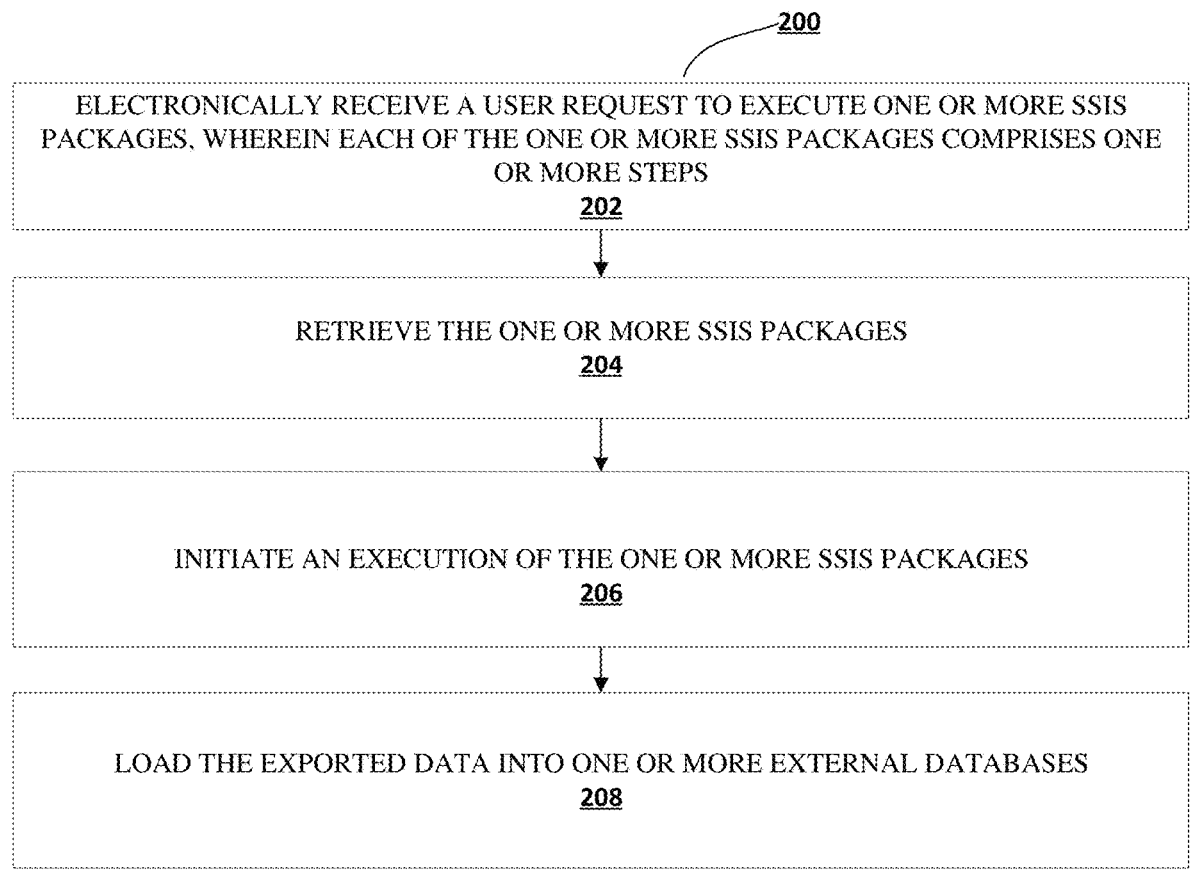
Figure 3:
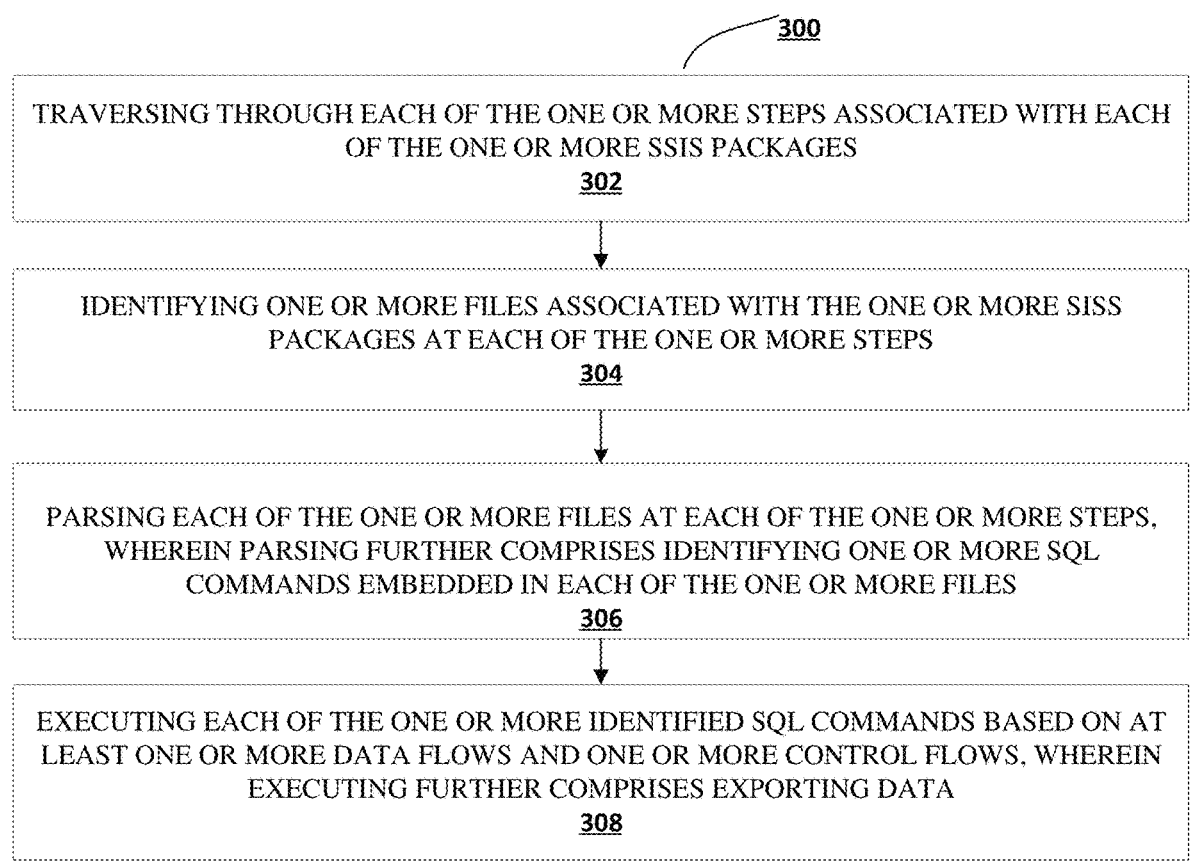

Having thus described embodiments of the invention in general terms, reference will now be made the accompanying drawings, wherein:

FIG. 1 illustrates technical components of a system for execution of SQL Server Integration Service (SSIS) package, in accordance with an embodiment of the invention;

FIG. 2 illustrates a process flow for extracting data from a data source, transforming the data, and loading the data into an external database using a SQL Server Integration Service (SSIS) package, in accordance with an embodiment of the invention; and FIG. 3 illustrates a process flow for execution of SQL Server Integration Service (SSIS) package, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

FIG. 1 presents an exemplary block diagram of the system environment for executing an SSIS package. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

An SQL Server Integration Service (SSIS) is a platform for building high performance data integration solutions, including extraction, transformation, and load (ETL) packages for data warehousing. SSIS includes graphical tools and wizards for building and debugging packages; tasks for performing workflow functions such as FTP operations, executing SQL statements, and sending e-mail messages; data sources and destinations for extracting and loading data; transformations for cleaning, aggregating, merging, and copying data; a management service, the Integration Services service for administering package execution and storage; and application programming interfaces (APIs) for programming the Integration Services object model.

An SSIS package is an organized collection of connections, control flow elements, data flow elements, event handlers, variables, parameters, and configurations. In one aspect, the control flow elements provide structure in packages, services to tasks that provide functionality in packages, and precedence constraints that connect containers and tasks into a control flow. In another aspect, data flow elements includes sources and destinations that extract and load data, the transformations that modify and extend data, and the paths that link sources, transformations, and destinations. In yet another aspect, the SSIS package includes at least one connection manager to manage a link between a package and a data source that defines the connection string for accessing data that the tasks, transformations, and event handlers in the in package use.

Typically, executing an SSIS package requires the user to open each SSIS package and execute each step to retrieve information such as database, stored procedure, and table and column details into a separate spreadsheet. However, in the current technology environment, each project may include multiple SSIS packages that need to be executed to retrieve the relevant information. The present invention provides the functional benefit of retrieving the relevant information more efficiently without the need for each SSIS package to be opened.

FIG. 2 illustrates a process flow for extracting data from a data source, transforming the data, and loading the data into an external database using a SQL Server Integration Service (SSIS) package 200, in accordance with an embodiment of the invention. As shown in block 202, the process flow includes electronically receiving a user request to execute one or more SSIS packages, wherein each of the one or more SSIS packages comprises one or more steps. In some embodiments, the system may be configured to provide an SSIS package analyzer application for installation on a user computing device. In one aspect, the SSIS package analyzer application may include one or more user interfaces configured to be displayed on the user computing device, and enable the user to select one or more SSIS packages to be executed. In some embodiments, the system may be configured to receive a user input via the one or more user interfaces associated with the SSIS package analyzer application to execute one or more SSIS packages.

Next, as shown in block 204, the process flow includes retrieving the one or more SSIS packages. In some embodiments, the one or more SSIS packages may be stored in a local memory device associated with the user computing device. In some other embodiments, the one or more SSIS packages may not be stored locally. In this regard, the system may be configured to initiate a fetch subroutine to establish a communication link with one or more databases in which the one or more SSIS packages are located. In one aspect, establishing the communication link with the databases may require a user authentication. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. In some embodiments, the system may be configured to initiate a portal embedded within the active user interface associated with the SSIS package analyzer application to initiate the authentication proceedings. The user may then be required to provide one or more authentication credentials via the portal. In response to receiving the authentication credentials of the user, the system may be configured to validate the authentication credentials of the user. A successful validation of the authentication credentials enable the user to retrieve the one or more SSIS packages.

Next, in response to retrieving the one or more SSIS packages, the process flow includes initiating an execution of the one or more SSIS packages, as shown in block 206. In some embodiments, the SSIS packages do not need to be open for the system to execute each SSIS package. Typically, executing the SSIS packages includes exporting data from one or more data sources specified in the SSIS packages. Please refer to FIG. 3 for a detailed process flow regarding the execution step. Next, the process flow includes loading the exported data into one or more external databases, as shown in block 208. In some embodiments, the exported data is in a uniform format (e.g., comma separated variable) and capable of being exported into a spreadsheet. In some embodiments, the system may be configured to export data associated with one or more task types. In this regard, the system may be configured to receive a user request to execute the one or more SSIS packages to export data associated one or more specific task types.

FIG. 3 illustrates a process flow for execution of SQL Server Integration Service (SSIS) package 300, in accordance with an embodiment of the invention. As shown in block 302, the process flow includes traversing through each of the one or more steps associated with each of the one or more SSIS packages. In some embodiments, the system may be configured to traverse each SSIS package step based on at least the predefined data flow, control flow, and connection managers. Next, the process flow includes identifying one or more files associated with one or more SSIS packages at each of the one or more steps, as shown in block 304. In some embodiments, each file includes one or more SQL commands capable of being executed.

Next, the process flow includes parsing each of the one or more files at each of the one or more steps, wherein parsing further comprises identifying the one or more SQL commands embedded in each of the one or more files. In one aspect, the system may be configured to parse information associated with one or more data sources and one or more external databases. Based on this information, the system may be configured to establish a communication link with each of the one or more data sources associated with each of the one or more identified SQL commands. In response, the system may be configured to retrieve the data from each of the one or more data sources, wherein retrieving further comprises determining one or more field names and one or more columns names. In some embodiments, the data in each data source may be in an unstructured format. In such cases, the system may be configured to transform the retrieved data based on at least one or more pre-determined transformations. Transformations are key components to the data flow that transform the data to a desired format as data moves from one step to another step. In some embodiments, the transformation is performed in-memory; after adding a transformation the data is altered and passed down the path in the data flow.

In some embodiments, the transformations may be synchronous or asynchronous. Synchronous are components like the conditional split or derived column transformation where rows flow into memory buffers in the transformation and the same buffers come out. No rows are held and characteristically these transformations perform very quickly with marginal impact to data flow. Asynchronous transformations includes two types—fully blocking and partially blocking. Partial blocking transformation is that transformation which creates new memory buffers for the output of the transformation than what come into the transformation, like union all transformation; fully blocking transformations also require a new memory buffer similar to partial blocking. Asynchronous transformations additionally cause a full block of the data like sort and aggregate transformations. Once transformed, the system may then be configured to export the transformed data into one or more external databases.

In some embodiments, the system may be configured to store the data retrieved from the one or more data sources in one or more staging tables in a temporary memory location prior to transforming the data. In response, the system may be configured to filter the data to remove one or more unneeded field names and one or more unneeded columns names. Once filtered, the system may be configured to then transform the filtered data.

Next, as shown in block 308, the process flow includes executing each of the one or more identified SQL commands based on at least one or more data flows and one or more control flows, wherein executing further comprises exporting data. In some embodiments, the system may be configured to determine that at least one of the one or more SQL commands are unexecutable. SQL commands may be unexecutable for reasons including, but not limited to being a remark, comment, cause the line to be skipped, or the like. In response, the system may be configured to generate an error message comprising the at least one of the one or more SQL commands that are determined to be unexecutable. In some embodiments, the system may be configured to transmit control signals configured to cause the user computing device to display the generated error message.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for execution of SQL Server Integration Service (SSIS) package, the system comprising:
   at least one non-transitory memory device with computer-readable code stored thereon;
   at least one processing device; and
   at least one module stored in said memory device and comprising instruction code that is executable by the at least one processing device and configured to cause said at least one processing device to:
      electronically receive a user request to execute one or more SSIS packages, wherein each of the one or more SSIS packages comprises one or more steps;
      retrieve the one or more SSIS packages;
      initiate an execution of the one or more SSIS packages without opening the one or more SSIS packages, wherein the execution further comprises:
         traversing through each of the one or more steps associated with each of the one or more SSIS packages based on at least predefined data flow, control flow, and connection managers;
         identifying one or more files associated with the one or more SSIS packages at each of the one or more steps;
         parsing each of the one or more files at each of the one or more steps, wherein parsing further comprises identifying one or more SQL commands embedded in each of the one or more files; and
         executing each of the one or more identified SQL commands based on at least one or more data flows and one or more control flows, wherein executing further comprises exporting data; and
      load the exported data into one or more external databases.

2. The system of claim 1, wherein the module is further configured to parse information associated with one or more data sources and one or more external databases.

3. The system of claim 2, wherein the module is further configured to execute each of the one or more identified SQL commands, wherein executing further comprises:
   establishing a communication link with each of the one or more data sources associated with each of the one or more identified SQL commands;
   retrieving the data from each of the one or more data sources, wherein retrieving further comprises determining one or more field names and one or more columns names;
   transforming the retrieved data based on at least one or more pre-determined transformations; and
   exporting the transformed data into the one or more external databases.

4. The system of claim 3, wherein the module is further configured to:
   store the data retrieved from the one or more data sources in one or more staging tables in a temporary memory location prior to transforming the data;
   filter the data to remove one or more unneeded field names and one or more unneeded columns names; and
   transform the filtered data.

5. The system of claim 1, wherein the module is further configured to:
   determine that at least one of the one or more SQL commands are unexecutable;
   generate an error message comprising the at least one of the one or more SQL commands that are determined to be unexecutable; and
   transmit control signals configured to cause a user device to display the generated error message.

6. The system of claim 1, wherein transforming further comprises transforming the data from one or more unstructured formats to a structured format to be loaded into one or more external databases.

7. A computerized method for execution of SQL Server Integration Service (SSIS) package, the method comprising:
   electronically receiving a user request to execute one or more SSIS packages, wherein each of the one or more SSIS packages comprises one or more steps;
   retrieving the one or more SSIS packages;
   initiating an execution of the one or more SSIS packages without opening the one or more SSIS packages, wherein the execution further comprises:
      traversing through each of the one or more steps associated with each of the one or more SSIS packages based on at least predefined data flow, control flow, and connection managers;
      identifying one or more files associated with the one or more SSIS packages at each of the one or more steps;

parsing each of the one or more files at each of the one or more steps, wherein parsing further comprises identifying one or more SQL commands embedded in each of the one or more files; and executing each of the one or more identified SQL commands based on at least one or more data flows and one or more control flows, wherein executing further comprises exporting data; and loading the exported data into one or more external databases.

8. The method of claim 7, wherein the method further comprises parsing information associated with one or more data sources and one or more external databases.

9. The method of claim 8, wherein executing further comprises:

establishing a communication link with each of the one or more data sources associated with each of the one or more identified SQL commands;

retrieving the data from each of the one or more data sources, wherein retrieving further comprises determining one or more field names and one or more columns names;

transforming the retrieved data based on at least one or more pre-determined transformations; and exporting the transformed data into the one or more external databases.

10. The method of claim 9, wherein the method further comprises:

storing the data retrieved from the one or more data sources in one or more staging tables in a temporary memory location prior to transforming the data;

filtering the data to remove one or more unneeded field names and one or more unneeded columns names; and transforming the filtered data.

11. The method of claim 7, wherein the method further comprises receiving the user request to execute the one or more SSIS packages, wherein the request further comprises a request to export data associated with one or more task types.

12. The method of claim 7, wherein the method further comprises:

determining that at least one of the one or more SQL commands are unexecutable;

generating an error message comprising the at least one of the one or more SQL commands that are determined to be unexecutable; and transmitting control signals configured to cause a user device to display the generated error message.

13. A computer program product for execution of SQL Server Integration Service (SSIS) package, the computer program product comprising a non-transitory computer-readable medium comprising code causing a first apparatus to:

electronically receive a user request to execute one or more SSIS packages, wherein each of the one or more SSIS packages comprises one or more steps;

retrieve the one or more SSIS packages;

initiate an execution of the one or more SSIS packages without opening the one or more SSIS packages, wherein the execution further comprises:

traversing through each of the one or more steps associated with each of the one or more SSIS packages based on at least predefined data flow, control flow, and connection managers;

identifying one or more files associated with the one or more SSIS packages at each of the one or more steps;

parsing each of the one or more files at each of the one or more steps, wherein parsing further comprises identifying one or more SQL commands embedded in each of the one or more files; and executing each of the one or more identified SQL commands based on at least one or more data flows and one or more control flows, wherein executing further comprises exporting data; and load the exported data into one or more external databases.

14. The computer program product of claim 13, wherein the first apparatus is further configured to parse information associated with one or more data sources and one or more external databases.

15. The computer program product of claim 14, wherein the first apparatus is further configured to execute each of the one or more identified SQL commands, wherein executing further comprises:

establishing a communication link with each of the one or more data sources associated with each of the one or more identified SQL commands;

retrieving the data from each of the one or more data sources, wherein retrieving further comprises determining one or more field names and one or more columns names;

transforming the retrieved data based on at least one or more pre-determined transformations; and exporting the transformed data into the one or more external databases.

16. The computer program product of claim 15, wherein the first apparatus is further configured to:

store the data retrieved from the one or more data sources in one or more staging tables in a temporary memory location prior to transforming the data;

filter the data to remove one or more unneeded field names and one or more unneeded columns names; and transform the filtered data.

17. The computer program product of claim 13, wherein the first apparatus is further configured to receive the user request to execute the one or more SSIS packages, wherein the request further comprises a request to export data associated with one or more task types.

* * * * *